United States Patent [19]

Beaudet et al.

[11] Patent Number: 5,515,487
[45] Date of Patent: May 7, 1996

[54] DISPLAYING PARTIAL GRAPHS BY EXPANDING AND COLLAPSING NODES

[75] Inventors: Phillip J. Beaudet, Pickering; Eduardus A. T. Merks, North York, both of Canada

[73] Assignee: International Business Machines Corporation, Armonk, N.Y.

[21] Appl. No.: 229,249

[22] Filed: Apr. 18, 1994

[51] Int. Cl.[6] ................................................ G06T 11/00
[52] U.S. Cl. ........................ 395/140; 395/155; 395/160
[58] Field of Search ................................. 395/140, 120, 395/155, 160, 161, 24, 123

[56] References Cited

U.S. PATENT DOCUMENTS

| | | | |
|---|---|---|---|
| 4,710,763 | 12/1987 | Franke et al. | 395/139 X |
| 4,829,450 | 5/1989 | Manthey | 395/60 |
| 5,018,075 | 5/1991 | Ryan et al. | 395/51 |

*Primary Examiner*—Almis R. Jankus
*Attorney, Agent, or Firm*—Martin J. McKinley; Duke W. Yee; Andrew J. Dillon

[57] ABSTRACT

A method for selectively displaying portions of complex graphics including trees, directed acyclic graphics, and cyclic graphics on a computer display screen while retaining information concerning all nodes interconnections so that graphic information can be correctly recalled as required. Relevant interconnection information concerning a node or nodes to be collapsed or expanded are collected and analyzed. Elements of that interconnect information are displayed while retaining all information needed to display any obscured or hidden portions of the graphic when required. All nodes connected to each selected node are identified and each identified node is assigned to a first set of nodes. A second set of nodes is created that is initially empty. Each node is removed from the first set of nodes and assigned to the second set of nodes. All nodes connected to a remove node are identified and compared to nodes already stored in the first set of nodes. When nodes are not found in the first set of nodes, the nodes are added to the second set of nodes. This process of removing and identifying connected nodes are repeated until the first set of nodes is empty.

14 Claims, 11 Drawing Sheets

DISPLAYING PARTIAL GRAPHS BY EXPANDING AND COLLAPSING NODES

BACKGROUND OF THE INVENTION

1. Technical Field

This invention relates to display generation, and more specifically, to the display of portions of large graphs of interconnected labeled nodes developed by a programmed computer system. The generated displays may include both full and partial, or skeletal, portions of the complex interconnected labeled nodes.

2. Description of the Related Art

Computer systems can store vast amounts of information. Often this information takes the form of complex graphs. For example, in the design of computer or telecommunication systems or networks, a computer can be useful in determining the most efficient design or investigating aspects of a design. However, such systems or networks, if displayed in their entirety on a computer screen, would provide a display where the individual elements or nodes of the system become illegible. Obviously, such an illegible display would not be helpful when examining a small group of nodes. It is essential that selected portions of the system or network be displayed in legible form. This might be done by simply scaling or magnifying the graph. However, simple scaling has serious drawbacks. It will result in large portions of the graph becoming invisible to the viewer. This would only be acceptable to the user where the invisible portions are not of interest. This is often not the case as the nodes and interconnections of interest are frequently not located in close proximity within the graph. Therefore, it is also necessary to be able to select disparate portions of the graph to be legibly displayed.

One way in which this has been done in the past is to simply collapse or truncate the arcs and nodes around selected nodes. Collapsing or truncating nodes in the context of the present invention means that the nodes and possibly, arcs associated with those nodes within the graph, are not displayed on the computer screen. Expanding of nodes is essentially the reverse operation where previously collapsed nodes and arcs are selected for display. This collapsing of nodes enables selected nodes to be displayed legibly while suppressing the display of related information which is not of current interest. One approach that uses this technique is described in U.S. Pat. No. 4,613,946 to E. H. Forman, which describes a process where portions of tree structures are collapsed so that portions of interest are more visible. Other portions of the structure are only skeletally displayed. Forman's techniques work well with normal tree structures having only descending branches, however, they will not work effectively with structures which include cyclic, acyclic or other types of graphs.

A typical problem encountered when displaying large graphs of interconnected labeled nodes is that the graph is too large to be displayed meaningfully within the limited screen space available in the computer system. A graph can, of course, be scaled down to make all of its nodes fit the screen but then the nodes become too small to display their labeling text. Similarly, a graph can be scaled up to make the nodes large enough to display their labeling text. In this case, the interconnections to nodes that do not fit on the screen will be obscured.

U.S. Pat. No. 4,953,106 to Gansner et al. describes techniques for efficiently drawing directed graphs. While the patent is not directed at, nor is it concerned with, displaying only portions of these graphs, it is helpful in providing insight into the technical complexities of such diagrams. Often, there is a need to display only portions of these graphs. The techniques described by Forman could not be used with Gansner et al. because the cyclic interconnection information in the directed graphs would be misinterpreted. The present invention avoids this problem.

SUMMARY OF THE INVENTION

The present invention provides a method for selectively displaying portions of complex graphs including trees, directed acyclic graphs and cyclic graphs on a computer display screen while retaining information concerning all nodal interconnections so that the graph information can be recalled correctly as required. The method involves collecting and analyzing relevant interconnection information concerning a node or nodes to be collapsed or expanded and displaying elements of that interconnect information while retaining all information needed to display any obscured or hidden portions of the graph when required. The invention further provides the ability to tailor a screen to show any desired disparate portions of a single graph or a plurality of graphs on the display. Nodes can be selectively pruned from or grafted onto the display in any arrangement desired by the user.

The present invention provides a process for selectively modifying a display of graphical information on a computer screen. The process consists of selecting at least one node on the graph for modification, identifying all the nodes connected to each selected node and assigning each identified node to a first set of nodes. A second set of nodes is created. The second set is initially empty. Each node is removed from the first set of nodes and assigned to the second set of nodes. All nodes connected to each removed node are identified and compared to nodes already stored in the first set of nodes. Where the nodes are not found in the first set of nodes, the nodes are added to the second set of nodes. The steps of removing and identifying all connected nodes are repeated until the first set of nodes is empty.

The present invention is directed to a method for selectively modifying a display of graphical information on a computer display screen. At least one node displayed on the screen is selected for modification. All nodes connected to each at least one selected node are identified and all nodes connected to each identified node are also identified. All identified nodes are deleted from the display when the identified node is below the selected node. Each node connected to a deleted node is highlighted on the display.

The present invention is also directed to modifying a display of graphical information on a computer display screen wherein identified nodes can be added to the display when an identified node is not already displayed.

The solution for collapsing and expanding the children and parents of a node provided by the present invention operates correctly and consistently for all types of graphs.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
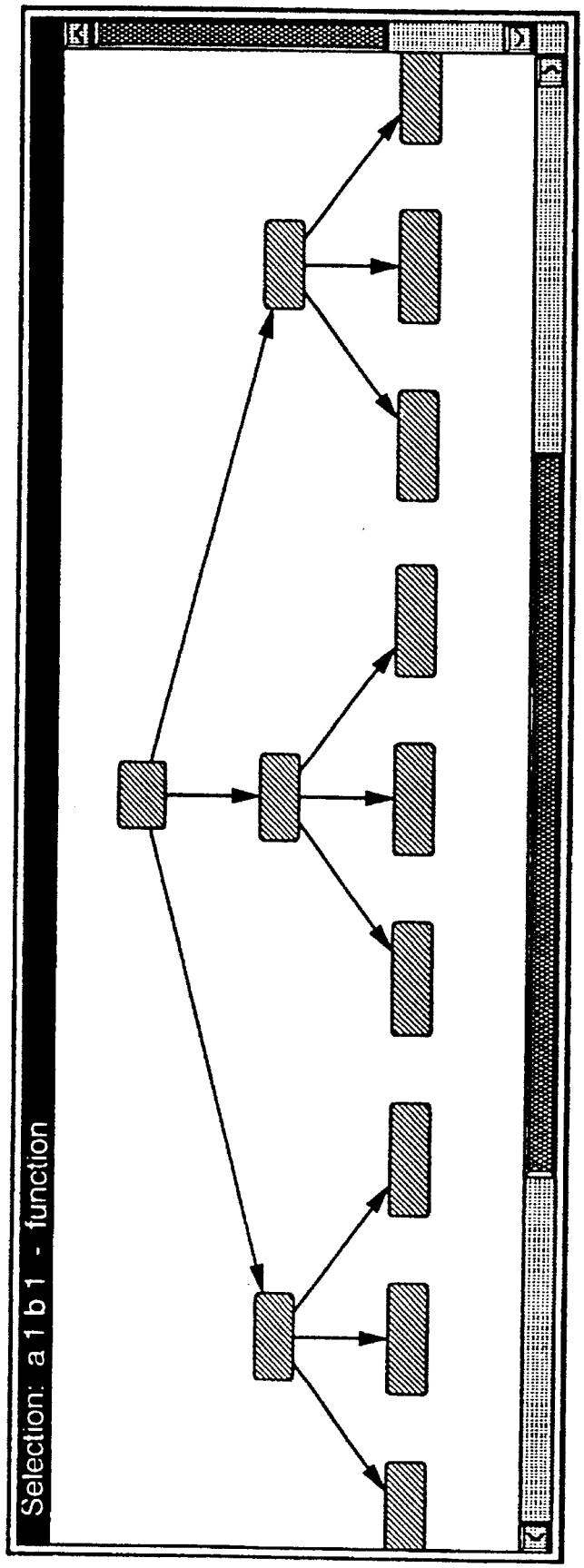
FIG. 1 illustrates a display on a computer screen where a selected node is highlighted.

FIG. 1 shows a graph that is too large for the label text to be displayed legibly. In this FIG. 1, the node a1b1 is highlighted and identified in the Selection status line shown near the top of the screen. This partially alleviates the problem of not being able to read a node's label text as the status line displays the label text of the selected node. This status line allows the user to determine the label of a node without scaling the graph. If the size of the display on the screen remains unmodified, it would be necessary to highlight each node individually to identify the nodal relationships being portrayed in the structure. The present invention provides a more direct approach for obtaining otherwise obscured nodal and interconnection information.

Figure 2:
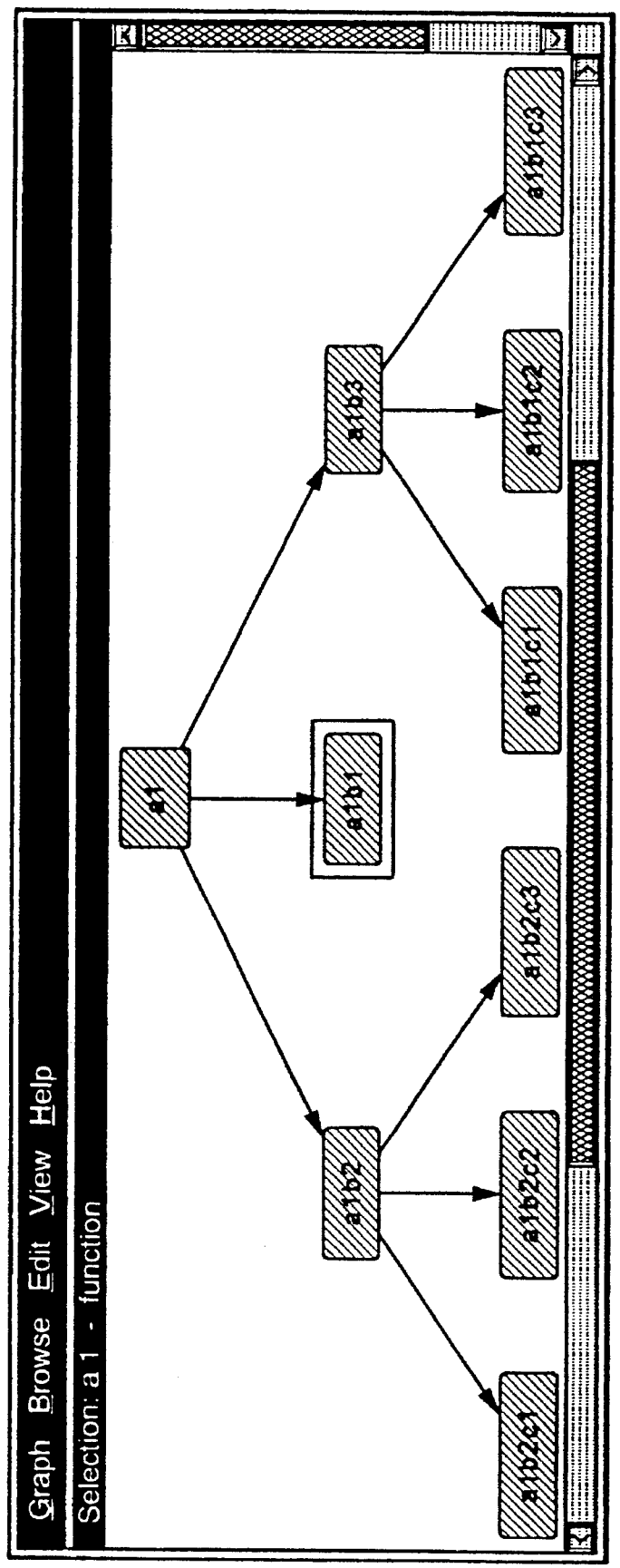
FIG. 2 illustrates a screen display where the node highlighted in FIG. 1 is collapsed.
Figure 3:
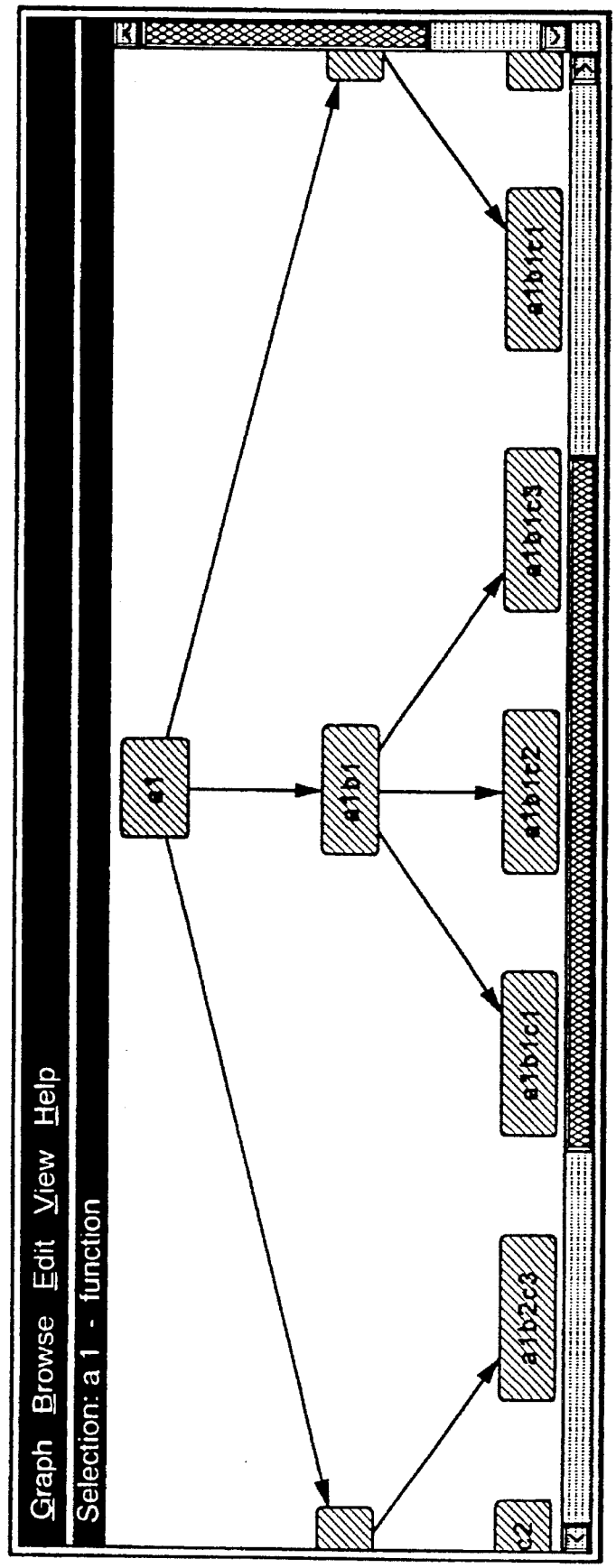
FIG. 3 illustrates a screen display where the scale of the displayed elements has been magnified.

FIG. 2 shows the same graph, as shown in FIG. 1, with the children of node a1b1 removed. By removing the children of node a1b1 from the graph shown in FIG. 1, it is now possible to enlarge each of the remaining nodes so the labels on each displayed node are legible without moving some of the nodes off the screen, as is illustrated in FIG. 3 where the size of the graph has simply been enlarged.

In FIG. 2, an outline box is created around the collapsed node a1b1 to indicate there are children associated with node a1b1 that are not displayed in the graph. This indication distinguishes nodes, such as node a1b1 in FIG. 2, that are candidates for subsequent expansion.

The graph displayed in FIG. 2, where all nodes displayed now have legible labels, cannot be obtained simply by scaling the graph in FIG. 1. FIG. 3 shows the effect of scaling the graph in FIG. 1 to enable the labelling of the nodes to be legible. As is readily apparent, some of the nodes are no longer visible on the screen.

Figure 4:
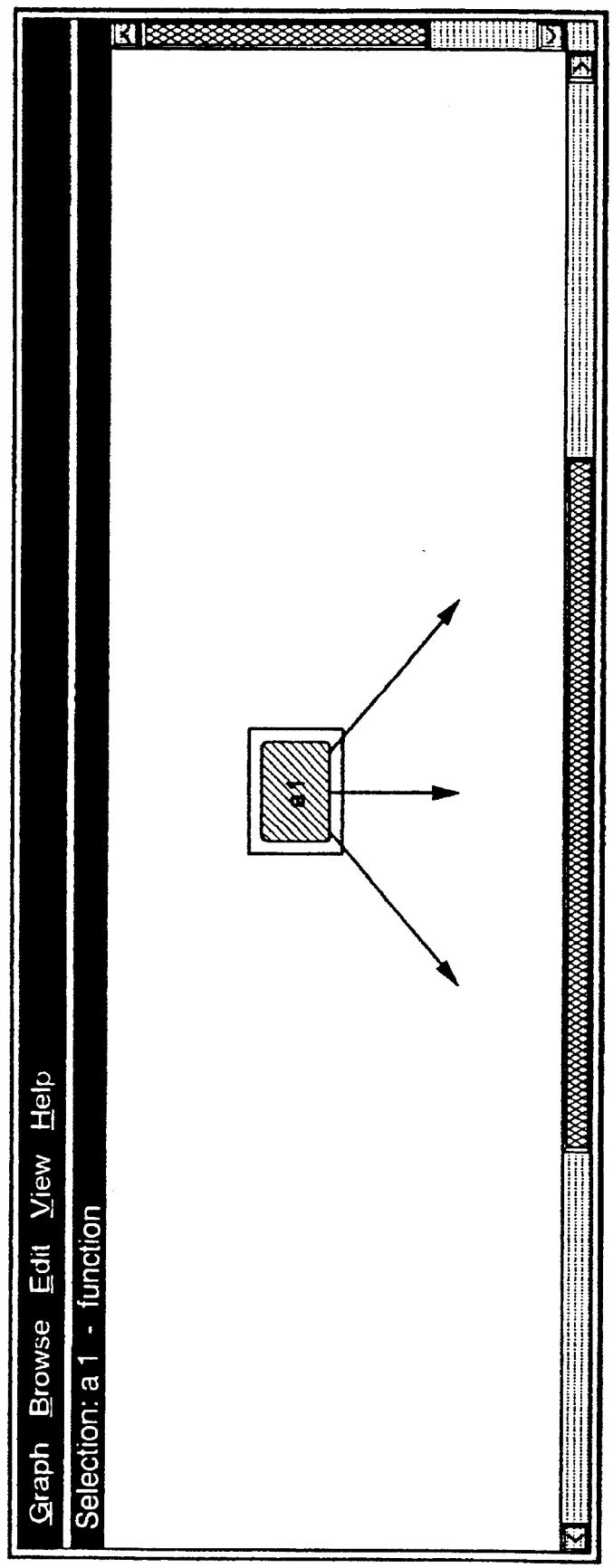
FIG. 4 illustrates a computer screen display of a collapsed node.

Another way of indicating a collapsed node is to leave its outgoing arcs intact and to hide its attached children. For example, FIG. 4 shows the graph of FIG. 1 collapsed at the root node a1. The outgoing arcs remain but the children are invisible. This view visually indicates the number of missing children (e.g., three in this instance), but it is not as compact as just marking the collapsed node with a box.

Many other graphical techniques could be used to distinguish collapsed nodes. For example, changing the shape of the node, or drawing a single outgoing arc with a label indicating the number of children could be used.

The examples illustrated in FIGS. 1 through 4 are simple tree structures which could readily be collapsed or truncated using techniques already taught in the art. However, our invention enables the user to not only acceptably collapse these simple tree structures but also collapse graph structures which may be acyclic or cyclic. The simple acyclic and cyclic graphs shown in FIGS. 5A through 8B will help demonstrate the ability our process has for collapsing selected portions of any type of graph.

Figure 5A:
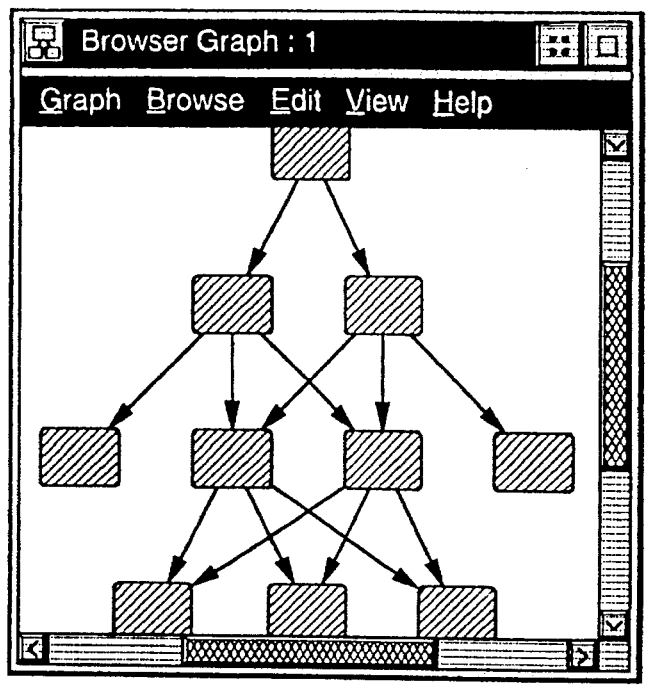
FIG. 5A illustrates a computer screen display of a structure having acyclic nodes.
Figure 5B:
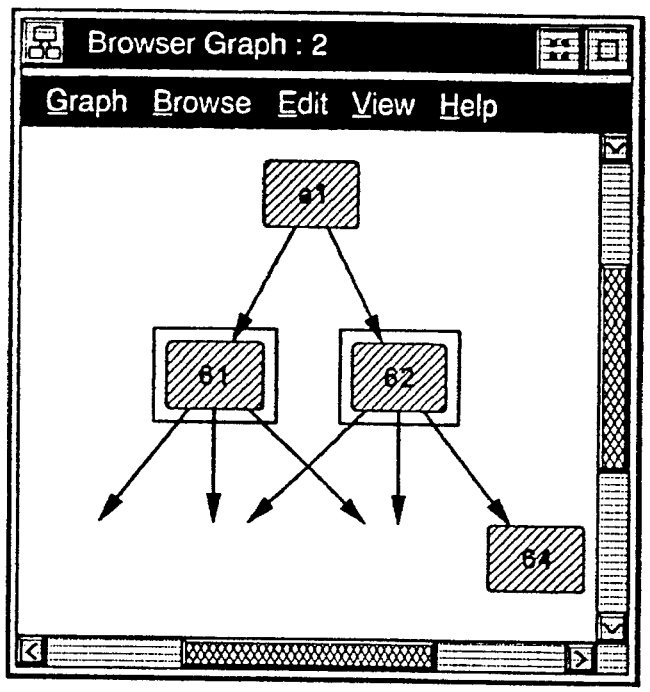
FIG. 5B illustrates a screen display of the structure of FIG. 5A when the selected node is collapsed.

To illustrate the utility of our invention, we have selected a display that includes a graph with nodes connected by directed arcs. FIGS. 5A and 5B show a structure including an acyclic graph while FIGS. 6A through 8B show a structure including a cyclic graph. In these figures, the graph layout procedure generally tries to place the source or parent nodes above their target or children nodes on the display screen. U.S. Pat. No. 4,953,106 describes one technique for devising a layout for a complex directed graph. Where the graph includes undirected arcs, each undirected arc is replaced with two directed arcs pointing in opposite directions. Of course, any other convention could be used to display the graphs, and the present invention would be equally applicable to those conventions with only the obviously necessary modifications to take into account the difference in the convention used. In general, our invention will work for any type of layout.

Figure 7A:
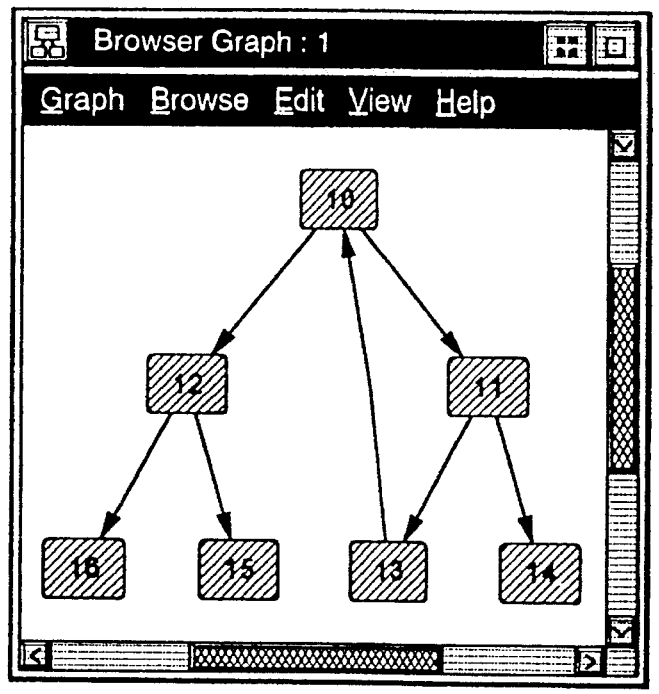
FIG. 7A illustrates a computer screen display of a structure having cyclic nodes with a selected node.
Figure 7B:
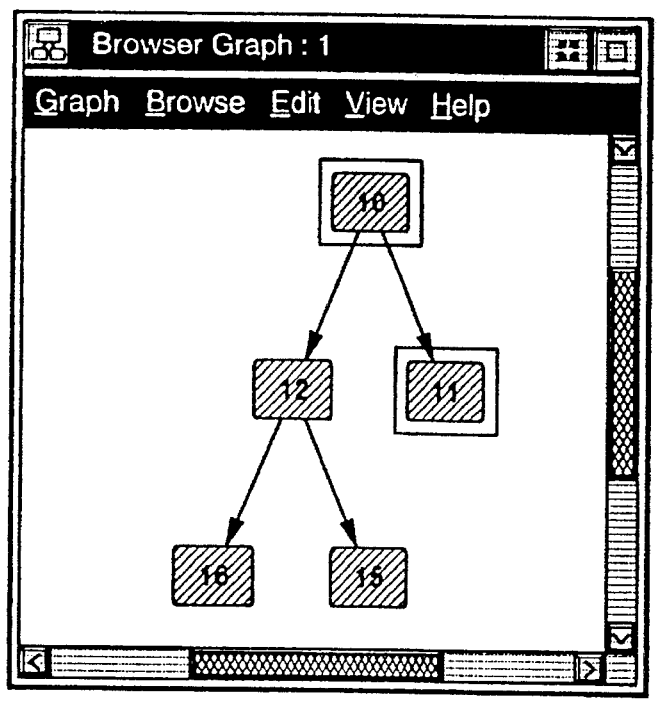
FIG. 7B illustrates a screen display of the structure of FIG. 7B when only descendants from the selected node are collapsed.

A collapse/expand procedure for a general directed graph can be devised as follows. When a node x is to be collapsed, each node that is below x in the current layout (i.e., has a y coordinate that is less than that of x) and can be reached from x by traversing arcs from source to target is removed from the graph. Similarly, when a node x is to be expanded, each node that can be reached from x by traversing arcs from source to target is added to the graph. In addition, a node x can be expanded by n levels by adding to the graph each node that can be reached from x by a path consisting of at most n arcs. FIGS. 7A and 7B show the collapse procedure applied to a graph, which is not a tree. In a left-to-right layout, where the graph is rotated 90 degrees in the counterclockwise direction, only the nodes to the right of x, those having an x coordinate greater than that of x, are considered for collapsing.

The collapse/expand procedure given above can be used to collapse and expand the children of a node. However, it can be easily revised to support the collapsing and expanding of the parents of a node by conceptually reversing both the direction of the arcs being considered and the above/below relation between nodes in the current layout. Using a combination of the collapse/expand procedures for children and for parents, a user can shrink or grow his graph to suit the amount of information he wishes available at any given point.

Figure 8A:
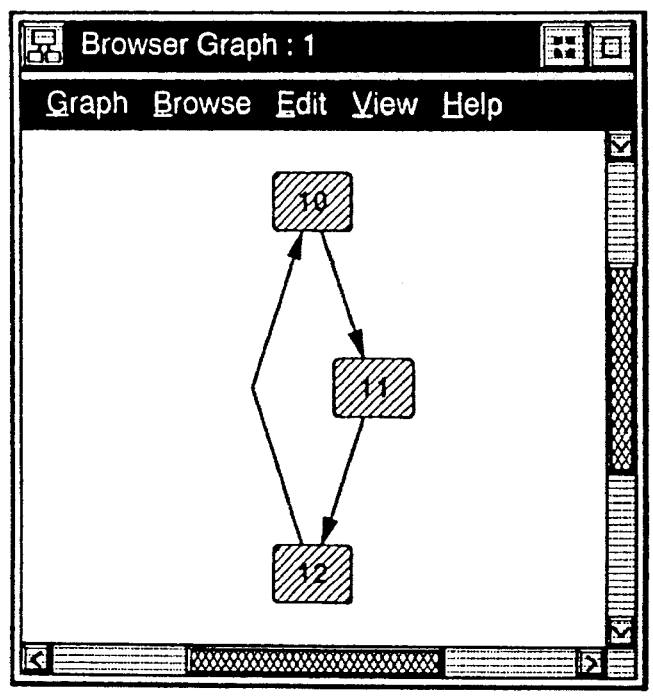
FIG. 8A illustrates a computer screen display of a cyclic graph structure.
Figure 8B:
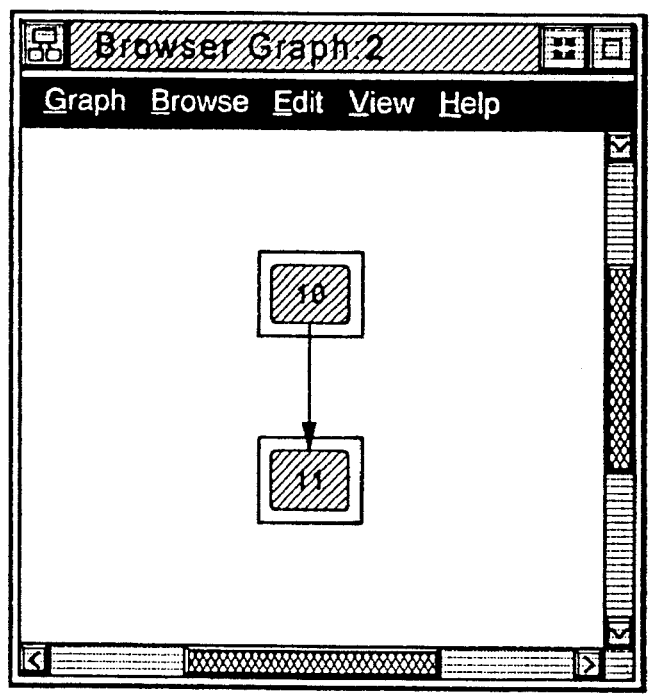
FIG. 8B illustrates a screen display of the cyclic graph structure of FIG. 8A when the selected node is collapsed.

It is important to note that the above procedures apply for general graphs which may contain cycles. FIGS. 8A and 8B show the procedure applied to a cyclic graph. Computing the solution for graphs that are trees is simple. Computing it for acyclic graphs is also simple, but redundant calculations may arise for nodes that are reachable along more than one path. Computing it for cyclic graphs must be done carefully to ensure that the implementation of the procedure terminates and does not go into an infinite loop.

Looping and redundant calculations can be avoided by computing the set of nodes to be collapsed for a node x by creating two sets of nodes. The first set is set s1, the set of nodes to be removed from the graph. The second set is the set s2, the set of nodes to be considered. Initially, set s1 is empty and set s2 contains the direct children of x. A node y is removed from set s2 and is included in set s1, and each child of the moved node y that is not already included in set s1 is now added to set s2. This process is repeated until the set s2 is empty. The set s1 now includes all the nodes which can be deleted under the selected node x. This process ensures that every node is considered only once.

Figure 9:
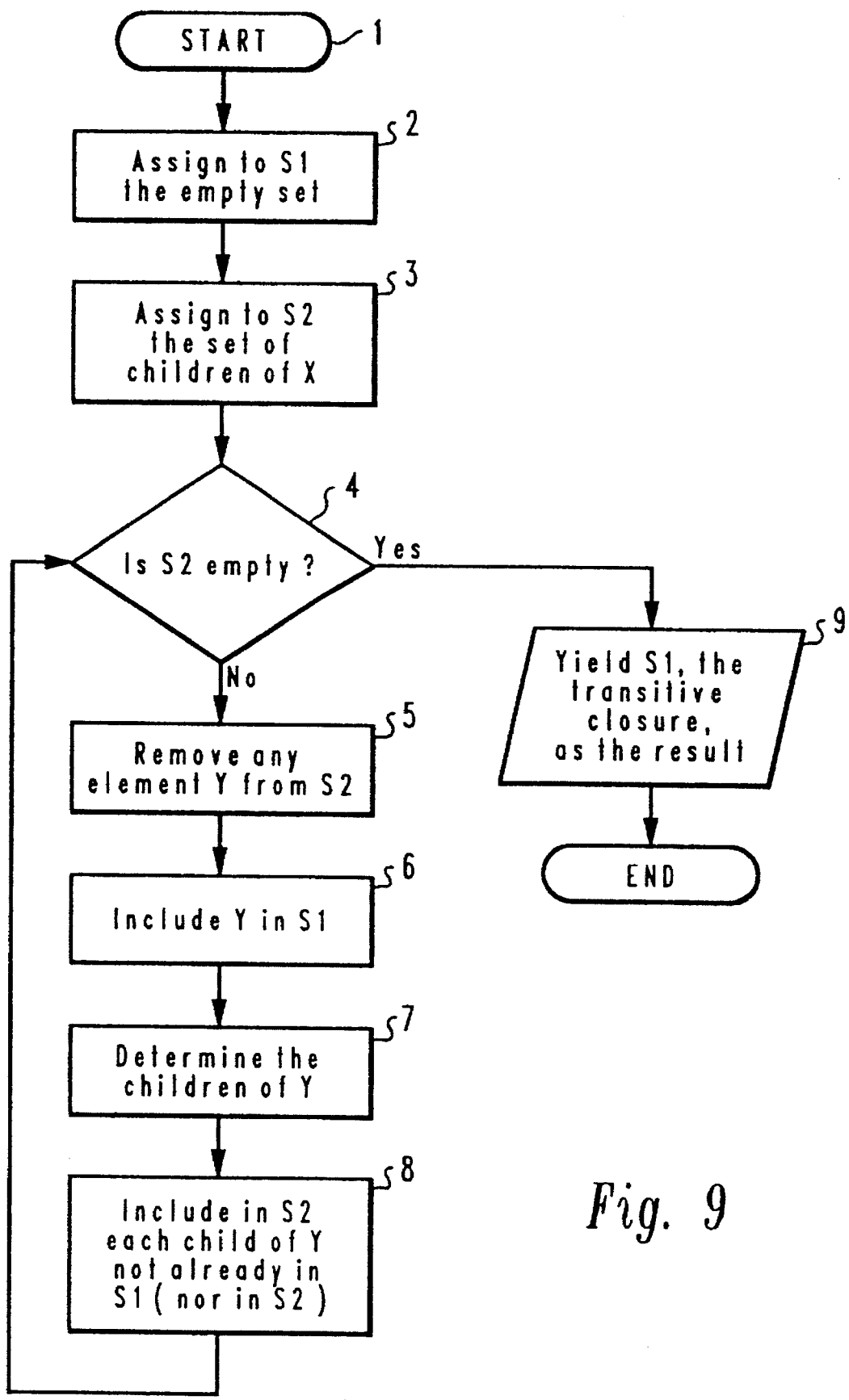
FIG. 9 is a flow diagram of the process for determining the transitive closure for a node in a graph.

FIG. 9 illustrates, by means of a flow diagram, the process by which nodes are deleted. A location is selected to store the first set of nodes s1, as indicated at step 2 on FIG. 9. Initially, there are no nodes in the first set of nodes s1, but ultimately the set s1 will contain the nodes which are not to be displayed.

A second set of nodes s2 is stored in a second location, as indicated at step 3 in FIG. 9. This second set of nodes is filled with the nodes of all the children of the node x that has been selected for display. For example, for the graph shown in FIG. 2, if the node a1 were selected, the nodes a1b1, a1b2 and a1b3 would be in set s2. The children of a node are all nodes directly connected to the selected node by an outgoing arc. The first step in the logical process of determining the nodes which are to be suppressed from display is to determine whether there are any children nodes of the selected node x, as indicated at step 4 in FIG. 9. In step 4, each child node stored in set s2 is individually removed from the set s2, as indicated at step 5 in FIG. 9. The removed child nodes are put in node set s1.

Next, all the children of the node y transferred to set s1 (step 6) are identified (step 7) and stored into node set s2 unless they are already stored in node set s1 (step 8). The steps 4 through 8 in FIG. 9 are repeated until the node set s2 is empty. At this point the node set stored in s1 represents the nodes that are reachable from the node x that is to be displayed (i.e., those nodes that can be reached by traversing arcs from source to target nodes starting at node x), as indicated at step 9.

FIG. 9 can also be used to illustrate the transitive closure relationship of the parent nodes to a node x. In this situation, the set assigned to set s2 would be the parent nodes of node x instead of the children nodes at step 3 and the children of y at step 7 would be the parents of y.

Once the nodes associated with the selected node x have been determined, it is now possible to either collapse or expand the nodes to be displayed on the computer screen depending on the users requirements.

Figure 10:
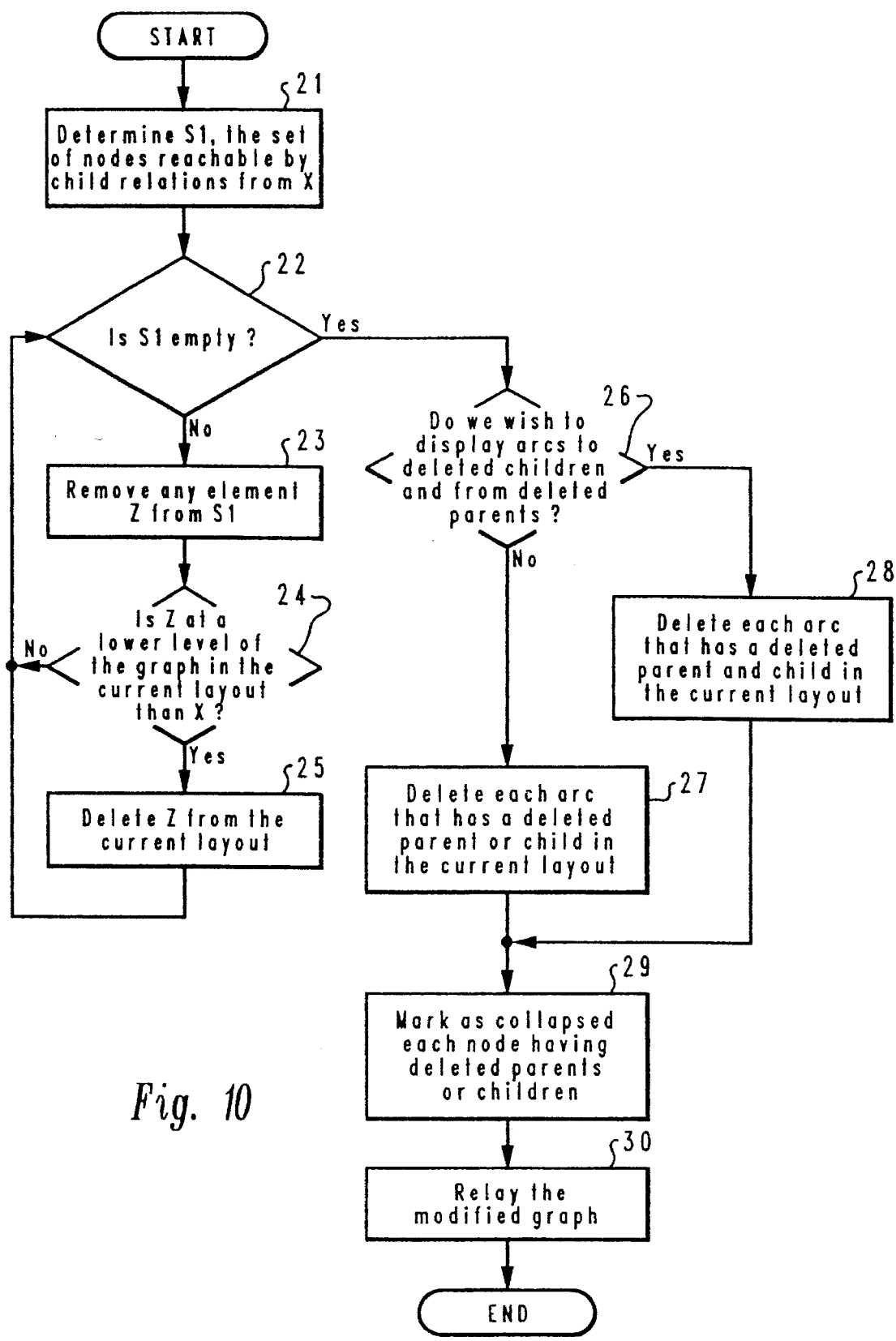
FIG. 10 is a flow diagram of the process for collapsing nodes associated with a selected node.

FIG. 10 illustrates how one would collapse the display below the selected node x. Initially, the set of nodes reachable by child relations of node x have been determined through the transitive closure operation described with reference to FIG. 9 as indicated in step 9. These nodes are now stored set s1, as indicated at step 21 in FIG. 10. The first step in collapsing the nodes currently displayed is to determine whether there are any nodes in set s1, as shown at step 22. If there are nodes in set s1, they are removed from the set, as shown at step 23.

As each node z is removed from set s1, it is examined at step 24 to determine its level in the graph relative to selected node x. Those nodes which are at a lower level in the graph than the selected node x are deleted from the current graph layout at step 25. Those nodes at a higher level than the selected node x are retained. The actual display is modified to provide an indication of these conditions. Where a node z is at a lower level than the selected node x, any node having z as a child or parent will be marked as collapsed.

When the set s1 has been emptied, it is necessary to determine how the collapsed graph is to be displayed. For example, it may be desirable to display arcs from the selected node x to its deleted children so that the collapsed graph does not leave the impression that the node x is a terminating node. As shown in FIG. 10, a determination is made at step 26 to determine whether arcs to deleted children or from deleted parents are to be displayed and how collapsed nodes are to be displayed. If the decision is not to display arcs, then all arcs to deleted children or from parents in the current graph layout are deleted, as indicated at step 27. As shown at step 28, if the arcs are to be retained, those arcs directed from a deleted parent to a deleted child must still be deleted since their retention would convey false information to the viewer.

Figure 6A:
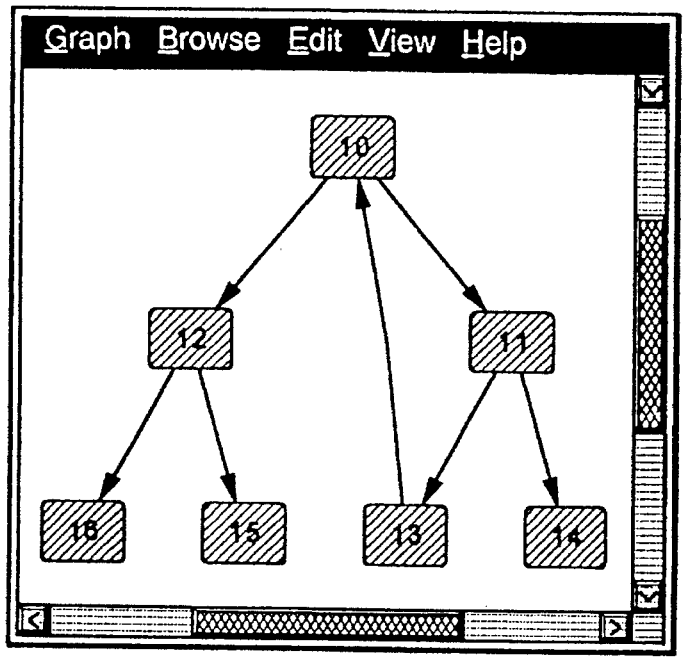
FIG. 6A illustrates a computer screen display of a structure having cyclic nodes with a selected node.
Figure 6B:
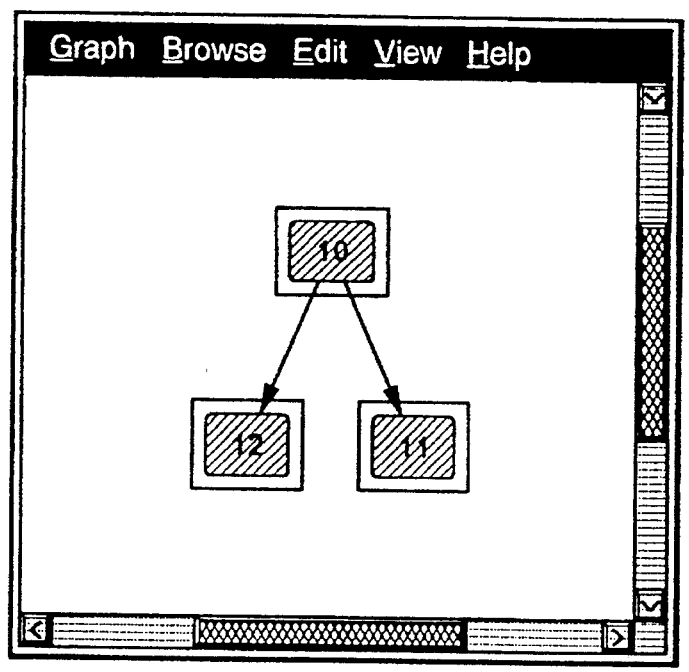
FIG. 6B illustrates a screen display of the structure of FIG. 6B when all reachable nodes from the selected node are collapsed.

When step 27 or 28 has been completed, it may be desirable to highlight the node x in some fashion so that it is clearly recognizable on the screen as a node that has interconnections that are not fully shown in the portion of the graph displayed. As shown at step 29, any node with a deleted parent or child node is marked with an outline box. As illustrated in the examples in FIGS. 2, 4, 5B, 6B, 7B or 8B, the collapsed node x is surrounded by an outline box. Finally, the modified information can be relayed and the modified graph displayed on the computer screen, as indicated by step 30. FIG. 6B shows the results of this procedure applied to the graph shown in FIG. 6A where all reachable nodes of the selected node are collapsed and arcs to deleted children or from a deleted parent are not displayed.

It should be noted that the procedure described in FIG. 10 can also be applied in the situation where it is desired to collapse the parents of selected node x rather than the children. In this case, the procedure works with the set s1 applying to the parents of node x and step 24 would consider nodes higher in the graph. One way to do this would be to conceptually reverse all the arcs of the graph and draw it upside down so the parents now become children.

Figure 11:
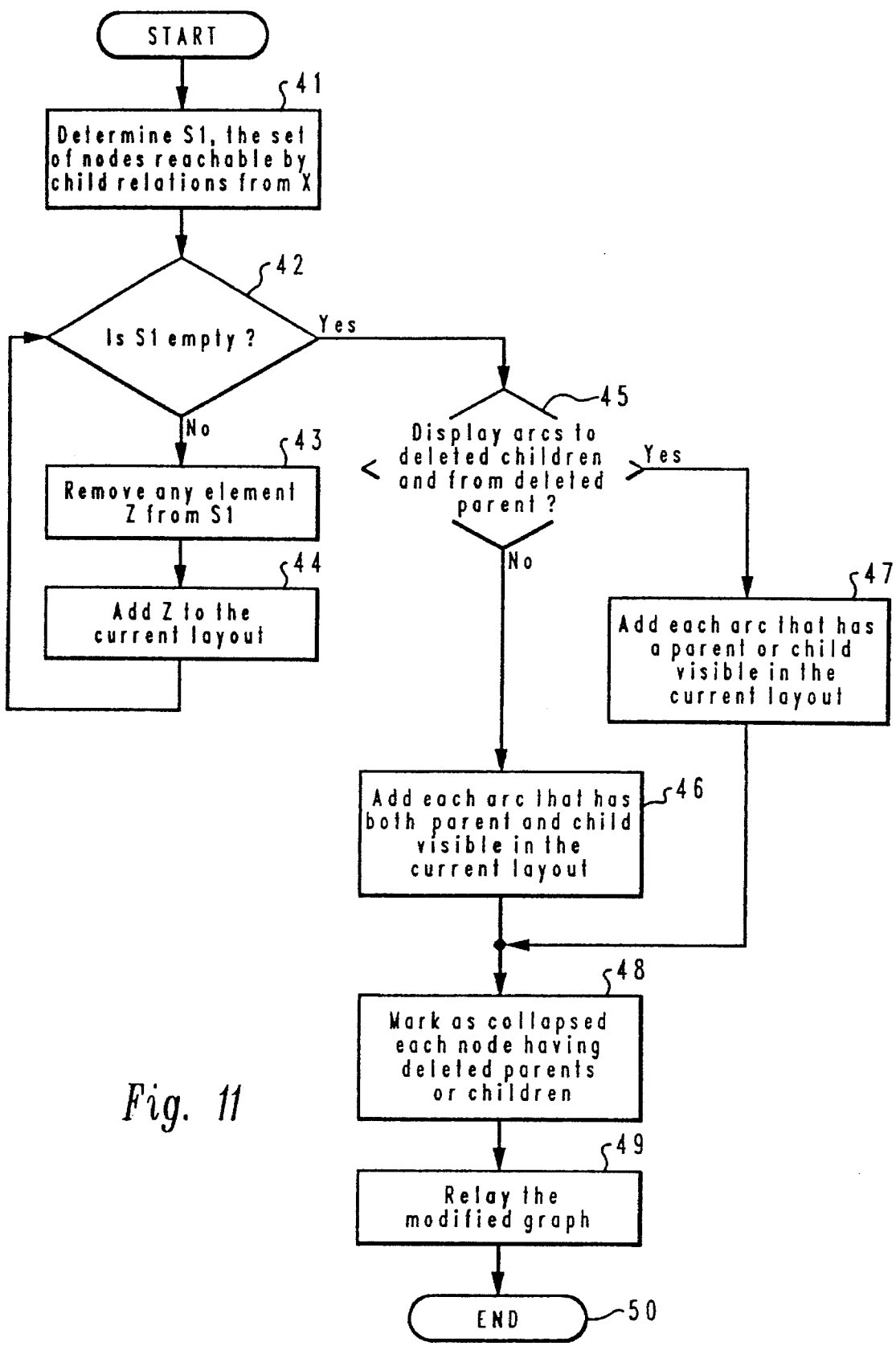
FIG. 11 is a flow diagram of the process for expanding nodes associated with a selected node.

FIG. 11 shows, schematically, the situation where it is desired to expand the display to show all the children of a selected node x. The first step is to identify all the nodes reachable by child relations from the selected node x. All these nodes are collected in a set s1, as indicated at step 41 in FIG. 11. Once the set s1 is stored, it is then examined at step 42 to determine whether the set s1 is empty. The set s1 for the node x is the same set s1 as was determined for the transitive closure in FIG. 9.

All the elements z in set s1 are removed from the set s1 as shown at step 43. As the elements are removed, they are added to the current screen layout as shown at step 44. The steps 42, 43 and 44 are repeated until the set s1 is empty. At this point, a decision is required as to whether arcs to deleted children or from deleted parents are to be displayed, as indicated at step 45. If the arcs are not to be displayed, then only those arcs that have both parent and child visible in the current screen layout are added to the layout, as indicated at step 46. If the arcs to deleted children or from parents are to be displayed, then all the arcs from parents or to children visible in the layout are added, as indicated at step 47.

When step 46 or 47 has been completed, it may be desirable to highlight the node x in some fashion so that it is clearly recognizable on the screen as a node that has interconnections that are not fully shown in the portion of the graph displayed. As shown at step 48, any node with a deleted parent or child node is marked with an outline box. As illustrated in the examples in FIGS. 2, 4, 5B, 6B, 7B or 8B, the collapsed node x is surrounded by an outline box. Finally, the modified information can be relayed and the modified graph displayed on the computer screen, as indicated by step 49.

It should be noted that the process performed in FIG. 11 can be applied to the parents of a node instead of the children. Instead of examining the children in step 41, the parent node would be examined.

The procedure to determine the nodes to be deleted for a node x can be modified to obtain a different behavior. As described above, the procedure of FIG. 9 first computes the set s1 from node x, and the process in FIG. 10 then filters s1 so as not to remove any node from the displayed graph that is positioned above x in the current layout. These two stages could be combined so that, as shown in steps 3 and 8 in FIG. 9, each child is included in the set s2 only if it is below the node x in the current layout. Using this variation, nodes will be removed from the display graph only if they are reachable along a path containing only nodes that are below the node x in the current layout. FIG. 7B shows the results of this variation applied to the graph shown in FIG. 7A where only the descendants (children below node x in the current layout) of the selected node are collapsed. This variation can, of course, be applied for collapsing parents as well.

Similarly, this variation can be applied for expansion. For this case, FIG. 9 is modified so that, in steps 3 and 8, each child is included in the set s2 only if it is either below the node x in the currently displayed graph or is not yet in the currently displayed graph. Using this variation, nodes will be added to the displayed graph only if they are reachable along a path containing only nodes not yet currently displayed or below the node x in the current layout. Again, this variation can be applied for expanding parents as well.

In pseudo code, the transitive closure procedure shown in FIG. 9 can be described as follows:

```
s1 = &phi.;
s2 = {children of x};
while y &memberof. s2 do
    begin
    s2 = s2 − {y};
    s1 = s1 &union. {y};
    s2 = s2 &union. ({children of y} − s1
    end
```

The above procedure can be applied to determine both the set of child nodes to be added during an expand and the set of child nodes to be removed during a collapse. When collapsing a node in an acyclic graph, the set of nodes that are actually removed from the graph may be a subset of the set computed by the above transitive closure procedure because only those nodes in the set that are actually below the node to be collapsed will in fact be removed from the graph. This procedure can also be modified to compute the variations of the collapse and expand procedure as described above.

The above procedure can also be applied to collapse and expand the parents of a node. For this case, the procedure is modified to compute the nodes that are reachable by a parent relation (as opposed to a child relation) and parents are removed only if they are actually above the node to be collapsed.

While the invention has been particularly shown and described with reference to preferred embodiment, those skilled in the art will understand that various changes in the form and detail may be made without departing from the spirit and scope of the invention.

What is claimed is:

1. A process for selectively modifying a display of graphical information on a computer display screen, said display of graphical information having a plurality of nodes, wherein nodes within said plurality of nodes are connected to each other with a plurality of arcs, said process comprising the computer implemented steps of:

a) selecting at least one node on said graph for modification;

b) identifying all nodes connected to each said at least one node in a first direction along at least one arc and assigning all identified nodes to a first set of nodes;

c) creating a second set of nodes, said second set being initially empty;

d) removing each node from said first set of nodes and assigning it to said second set of nodes;

e) identifying all nodes connected in said first direction to each said removed node in said second set nodes f) comparing each node identified in step e) to nodes stored in said first set of nodes and adding each node identified in step e) that is not in said first set of nodes to said second set of nodes; and g) repeating said steps d) through f) until said first set of nodes is empty.

2. The process in accordance with claim 1 further including the step of refreshing the contents of the display screen to replace the first displayed graph with a graph containing collapsed nodes.

3. The process in accordance with claim 2, further comprising highlighting said collapsed nodes on said computer display screen.

4. The process in accordance with claim 3, wherein said step of highlighting includes drawing a box around each collapsed node.

5. The process in accordance with claim 3, wherein each collapsed node has a shape and wherein said step of highlighting includes changing the shape for each collapsed node.

6. The process in accordance with claim 3, wherein said step of highlighting includes modifying a color for each collapsed node.

7. The process in accordance with claim 2 further comprising displaying arcs from collapsed nodes not currently displayed in the graph.

8. A method for selectively modifying a display of graphical information on a computer display screen, wherein said display of graphical information includes a plurality of nodes, wherein said plurality of nodes are arranged in a plurality of levels, said method comprising the steps of:

a) selecting at least one node displayed on said screen for modification;

b) identifying all nodes connected to each at least one selected node;

c) identifying all nodes connected to each said node identified in step b);

d) deleting all nodes identified in step b) and c) from said display when said identified node is located in a level below said selected node; and e) highlighting each retained node that is connected to a deleted node.

9. The method in accordance with claim 8 further including the step of refreshing the contents of the display screen to replace the first displayed graph with a graph containing collapsed nodes.

10. The process in accordance with claim 9, further comprising highlighting said collapsed nodes on said computer display screen.

11. The process in accordance with claim 10, wherein said step of highlighting includes drawing a box around each collapsed node.

12. The process in accordance with claim 10, wherein each collapsed node has a shape and wherein said step of highlighting includes changing the shape for each collapsed node.

13. The process in accordance with claim 10, wherein said step of highlighting includes modifying a color for each collapsed node.

14. The process in accordance with claim 9 further comprising displaying arcs from collapsed nodes not currently displayed in the graph.

* * * * *